US010999127B1

(12) United States Patent
Zuber et al.

(10) Patent No.: US 10,999,127 B1
(45) Date of Patent: May 4, 2021

(54) CONFIGURING NETWORK DEVICES USING A SHARED FAILURE DOMAIN

(71) Applicant: Amazon Technologies, Inc., Seattle, WA (US)

(72) Inventors: Owais Bin Zuber, Dublin (IE); Stephen Callaghan, Kildare (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/001,788

(22) Filed: Jun. 6, 2018

(51) Int. Cl.
*H04L 12/24* (2006.01)
*H04L 12/26* (2006.01)
*H04L 12/703* (2013.01)
*H04L 12/933* (2013.01)

(52) U.S. Cl.
CPC ........ *H04L 41/0672* (2013.01); *H04L 41/065* (2013.01); *H04L 41/0668* (2013.01); *H04L 41/12* (2013.01); *H04L 43/0817* (2013.01); *H04L 45/28* (2013.01); *H04L 49/1515* (2013.01)

(58) Field of Classification Search
CPC ............. H04L 41/0654; H04L 41/0672; H04L 41/147; H04L 45/02; H04L 45/24; H04L 45/28; H04L 49/25; H04L 49/557; H04L 45/586; H04L 41/065; H04L 41/0668; H04L 41/12; H04L 43/0817

USPC .......................... 370/217, 221, 242, 248, 216
See application file for complete search history.

(56) References Cited

U.S. PATENT DOCUMENTS

| | | | |
|---|---|---|---|
| 8,554,952 B1 | 10/2013 | Brar et al. | |
| 8,995,249 B1* | 3/2015 | Roy ...................... | H04L 41/147 370/216 |
| 2011/0170405 A1* | 7/2011 | Beecroft ............... | H04L 49/557 370/217 |
| 2015/0172172 A1* | 6/2015 | DeCusatis ............... | H04L 12/44 370/219 |
| 2016/0020939 A1* | 1/2016 | Ramasubramanian | ...................... H04L 45/586 370/217 |

* cited by examiner

*Primary Examiner* — Harun Chowdhury
(74) *Attorney, Agent, or Firm* — Klarquist Sparkman, LLP

(57) ABSTRACT

Remediation of network devices that are failing is accomplished using a Shared Failure Domain (SFD) database that provides neighboring device/link information to remediation tools. SFD refers to a group of objects (links/devices) that share a same failure model. A state change of one or multiple of the objects results in a corresponding action on other devices linked together through the SFD. Moreover, the SFD data is available in a central repository and software tools consult the central repository for failure domain data before taking remedial actions. SFD data is generated using configuration generation and device state. Software tools lookup SFD data during operational events (device/link down) and take appropriate actions on the neighboring devices.

20 Claims, 6 Drawing Sheets

US 10,999,127 B1

CONFIGURING NETWORK DEVICES USING A SHARED FAILURE DOMAIN

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. ECMP is per-hop decision limited to a single router, and can be inefficient if routers in the network are not functioning.

DETAILED DESCRIPTION

Failure modes pertaining to hardware (devices/links/transceivers) failures in three-tier Clos networks are difficult to calculate and remediate due to the complexity of Clos fabrics and combined failures. Combined failures are defined as two or more failures in a Clos network degrading the overall capacity of the fabric. Combined failures can happen over a period of time where the fabric's overall capacity is gradually reduced below an acceptable threshold, which increases the risk of traffic congestion. Clos fabrics are composed of a large number of devices and links that increases the possibility of combined failures in the network. Sometimes a device or link failure requires remediation action on a neighboring device. However, neighboring device information is not available to operational tools. The result can be congestion on one or more ports on the network devices.

Shared Failure Domains (SFD) provide neighboring device/link information to remediation tools. SFD refers to a group of objects (links/devices) that share a same failure model. More particularly, if a device or port of a device fails, then other devices or other ports are treated similarly in terms of actions taken in response to the failure. In one example, if one port fails, then both that port and any other port in the group of objects are deactivated. In other embodiments, if the entire device fails or is shifted away, then other related devices within the SFD can be shut down entirely or shifted away. A state change of one or multiple of the objects results in a corresponding action on other devices linked together through the SFD. Moreover, the SFD data is available in a central repository and software tools consult the central repository for failure domain data before taking remedial actions. SFD data is generated using configuration generation, network topology and device state. Software tools lookup SFD data during operational events (e.g., if a device or link is down) and take appropriate actions on the neighboring devices. Software tools can define workflows for each network design and failure event. SFD data can also have a field for specifying network design. Based on the network design, software tools can identify which particular workflow should be executed for a given device.

Figure 1:
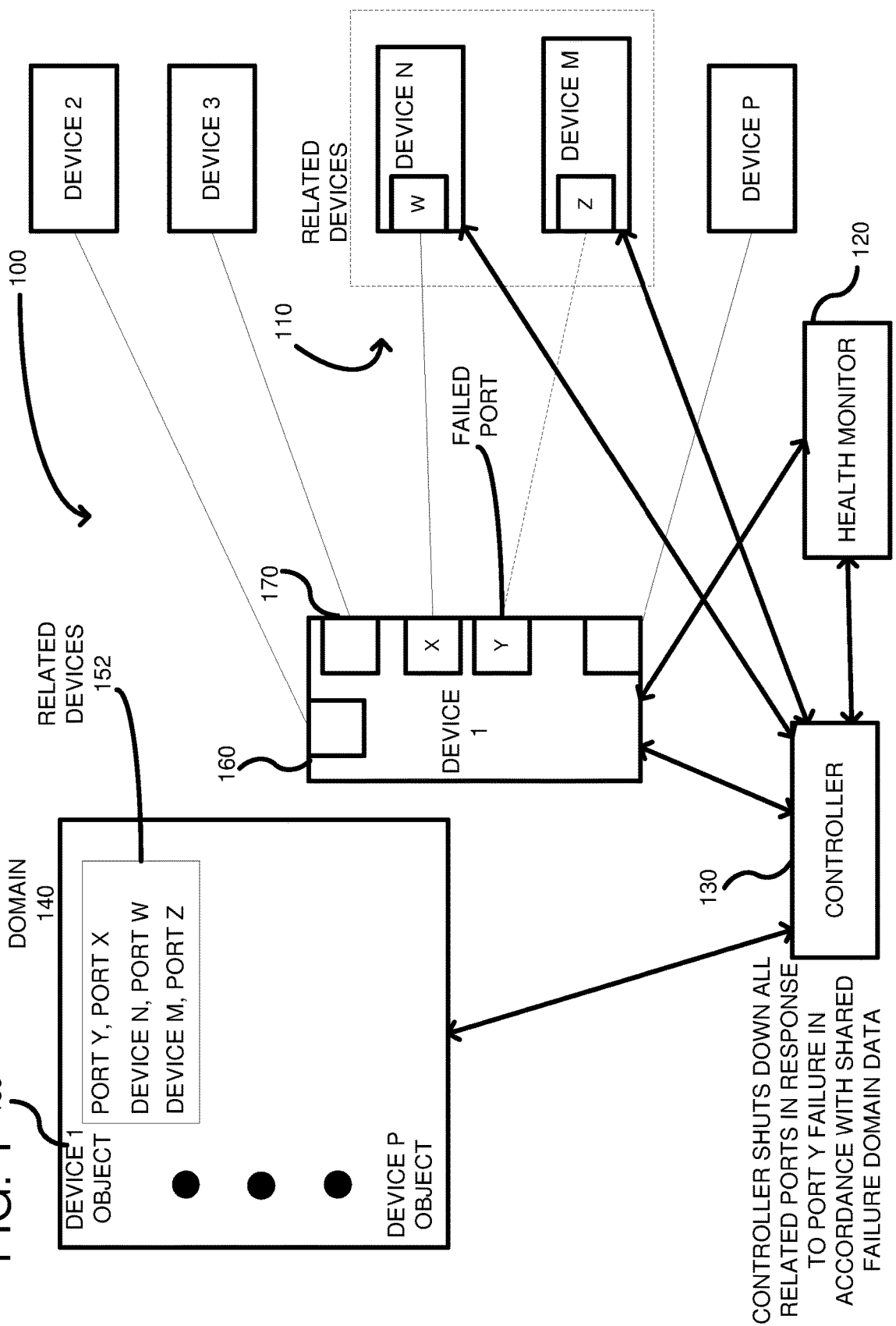
FIG. 1 is a system diagram showing a network device having a failed port and a controller configuring the network device and neighboring network devices using a shared failure domain database.

FIG. 1 is a system for configuring network devices using a shared failure domain database. A network is shown at 100. The topology of the network 100 is generally a Clos-type network, but other network topologies can be used, such as a multi-tier (any number of tiers), a bus, star, or ring-type network topologies. The network 100 includes a plurality of network devices 110. The network devices can be any switches for forwarding packet data including, but not limited to, routers, switches, load balancers, firewalls, etc. A health monitoring service 120 can be coupled to the network devices 110 and can detect a failure of the device itself or one or more ports on the device. More particularly, the health monitoring service 120 can be in communication with a processor on each of the network devices 110 requesting diagnostic information whether any port on the device has failed. The health monitoring service 120 can perform periodic ping commands. If any port on a device 110 appears to be malfunctioning due to reduced throughput, complete failure or packet loss, the health monitoring service 120 can report the error condition to an external controller 130. Both the controller 130 and the health monitoring service 120 can execute on server computers that are in communication with the network devices 110 through a communication network (not shown). In order to take remedial action, the controller 130 accesses a shared failure domain (SFD) database 140. The health monitoring service 120 can also be partially implemented or completely implemented on the network devices themselves, such as an agent executing on the control plane.

Figure 2:
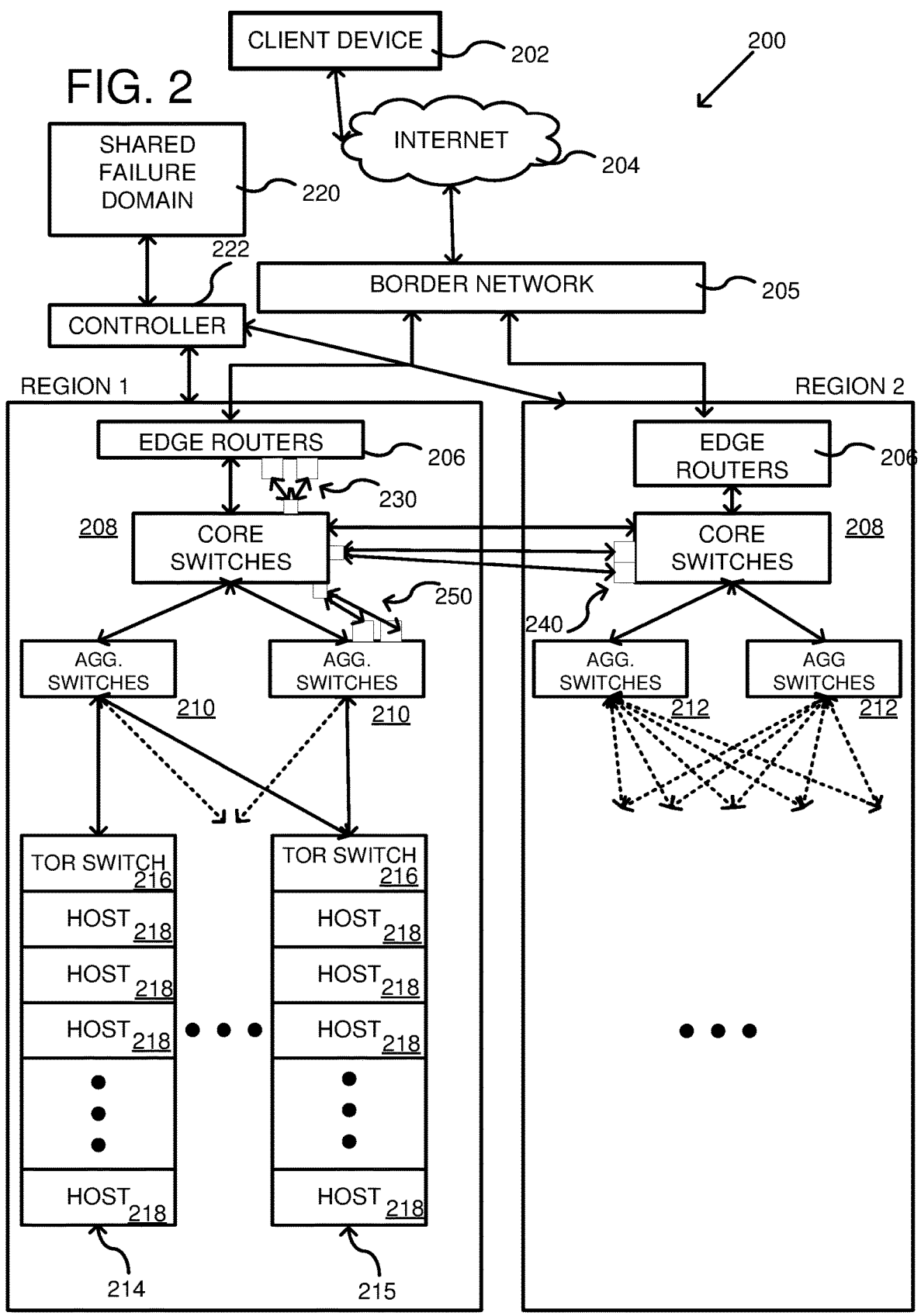
FIG. 2 shows a detailed network diagram wherein a shared failure domain is used in various network configurations.

The SFD database 140 includes an object (e.g., a record) per device in the network 100. For example, an object for device 1 is shown at 150 and includes one or more fields 152 of related devices. The structure of the objects can differ based on the particular implementation. However, each device port can have its own entry with devices related to that port should it fail. The related devices include at least one other related port on the same device and neighbor devices and ports on those neighbor devices. The SFD database can be populated using a variety of techniques. One technique is to analyze a topology of the network, and any neighboring devices that are within a similar grouping on the network can be considered related. Thus, the device object can be populated based on a logical network analysis of the topology. Network management rules can also be used in conjunction or in place of the logical network analysis. For example, in some cases where network traffic is low, a reduction in capacity can be considered acceptable. In a very particular example, capacity can be reduced by 50%, but the utilization of the interfaces is only 5%. Thus, the network management rules can consider utilization and other factors as a supplement to the logical network analysis to determine an entry in the SFD database. In other embodiments, the SFD database can include some of the network management rules, and other network management rules are implemented directly in the controller 130. Turning briefly to FIG. 2, such groupings can include that the network devices are within a same aggregation layer, a same core layer, a same edge layer, or sub-groups within those layers. Another technique for populating the SFD database includes identifying network devices that have a same prefix within a forwarding table of the device. In any case, an identification is made that a failure on one port results in an increase in network traffic on another port in the same network device. Such an increase in traffic is due to the ECMP protocol, which could take too much time to update all neighbor devices of the failing port. And before updates occur, the related port on the same network device can become overloaded.

To overcome this problem with overloading an operational port, the controller 130 can shut down (i.e., disable) all of the related ports listed within the SFD database 140. Alternatively, the controller 130 can disable the entire device or shift away the device. In the particular example shown in FIG. 1, device 1 160 has related ports X and Y, wherein port Y is indicated in a dashed line to symbolize that the link is failing due to packet loss or other reasons. Rather than shutting down only failed port Y, the controller 130 searches within the SFD database 140 using device 1 as a key in the lookup. An object 150 can be found for device 1 and that object contains information for each port and how the ports can relate to other ports. In this case, port Y is indicated as related to port X in the same device and port W in device N and port Z in device M. Despite that port X, W and Z are fully operational (i.e., functioning without fault), the controller 130 shuts down or otherwise disables all ports that are related devices as defined in the device 1 object 150. Thus, the failing port Y is shut down together with operational ports X, W and Z. Notably, a non-failing port (port X) on the same device is shut down and non-failing ports on neighbor devices are shut down in response to the failure of port Y. Meanwhile, other ports on device 1, such as port 170, remain operational and are not shut down. Thus, packets can continue from device 1 160 to other neighbor devices, such as device 2, device 3, and device P (where P is any integer value).

An advantage of shutting down operational ports is that for certain prefixes that use ports X and Y, other devices will not send packets to device 1 and will send such packets to other network devices. As a result, throughput actually increases and packet loss decreases, as opposed to port X being left operational and getting overloaded, such that packets are dropped. As a particular example, a device can have two 10 Gb ports (i.e., interface capacity) with a device utilization of 12 Gb, which is evenly distributed amongst the ports (6 Gb each). If one of the two ports is shut down, the entire 12 Gb is shifted to the other of the two ports. The result is dropped packets and congestion. In this particular example, rather than lose packets, it is more advantageous to shut down both ports.

FIG. 2 illustrates an example configuration 200 of a hierarchical structure of routers and/or switches that can be used in a region (which is a geographical area in which a data center resides). Each region represents a traditional hierarchical network design that can be used to route requests to specific host machines or other such devices, in order to provide users or applications with access to a variety of distributed resources. This example shows a typical design that can be used for a data center, wherein a source, such as a client device 202 is able to send requests across a network 204, such as the Internet, to be received by one or more components of the data center via a border network 205. Properties of various components of the network, such as provisioned instances, etc., can be managed using at least one management system, component, or service (not shown). In the illustrated example, the requests are received over the network 204, passed through the border network 205 to edge routers 206 in a region. The packets are then transmitted to one of a plurality of core switches 208, but it should be understood that there can be any of a number of other components between the network and the core switches. As traditional differentiators have substantially disappeared, the terms "switch" and "router" can be used interchangeably. For purposes of clarity and explanation this document standardizes on the term "switch," but it should be understood this term, as used, also encompasses routers and other devices mentioned above. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs. Utilizing aggregation switches in pairs provides a redundant capability in case one of the switches experiences a failure or is otherwise unavailable, such that the other devices can route traffic through the connected devices. Each pair of aggregation switches 210, 212 is linked to a plurality of physical racks 214, 215, each of which typically contains a top of rack (TOR) or "access" switch 216 and a plurality of physical host machines 218, such as data servers and other processing devices. As an additional benefit, the use of aggregation switch pairs enables the capability of a link to be exceeded during peak periods, for example, wherein both aggregation switches can concurrently handle and route traffic. Each pair of aggregation switches can service a dedicated number of racks based on factors such as capacity, a number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 204. In some embodiments, the core switches are provided in pairs as well.

Similar to FIG. 1, the FIG. 2 embodiment includes an SFD database 220 accessible by a controller 222. The controller 222 operates as a manager to regions 1 and 2 and can disable network devices or ports on network devices in accordance with a desired failure policy. Each of the core switches 208, the edge routers 206 and the aggregation switches 210 can include 3-tier Clos networks. Examples are shown where the SFD provides an increased efficiency over prior techniques. In particular, if ports on a switch within the core switches 208 is coupled to two related routers within the edge routers 206, as shown at 230, then the controller 222 can shut down all ports should one of the ports on the core switch fail. Likewise, as shown at 240, a core switch in region 1 can have multiple ports coupled to separate switches in the core switches of region 2 (e.g., core switches in a first data center coupled to core switches in a second data center). In such a case, the controller 222 can also shut down all ports associated with these connections. Still further, multiple ports of a core switch 208 can be coupled to multiple switches in the aggregation layer 210, as shown at 250. Again, if the switches are all related in accordance with the SFD table 220, then the controller 222 can shut down all ports related to the connections shown at 250. Thus, increased efficiency is realized wherein multiple ports in one layer of a network are coupled to ports on different switches in another layer of the network, wherein the different switches have the same IP prefix for incoming packets. In such a case, failure on one port can result in shutting down of all related ports to steer network traffic away from all ports that are related to the failing port.

Figure 3:
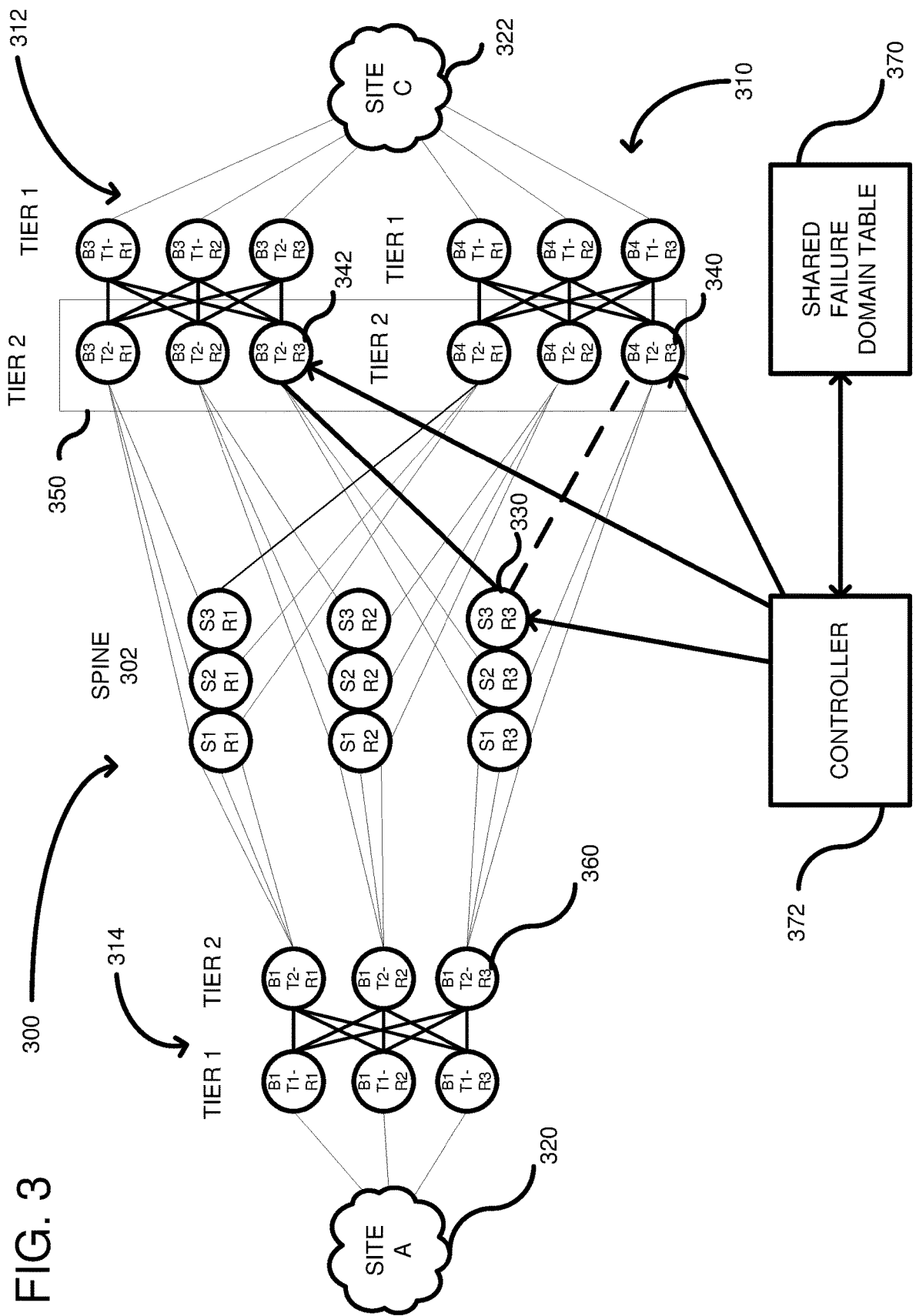
FIG. 3 shows a 3-tier Clos-type network configuration, wherein a centralized controller is configuring devices in multiple tiers based on the shared failure domain database.

FIG. 3 shows a 3-tier Clos network 300 that can be used as a basic structure for any of the network layers described herein, such as an aggregation layer, a core layer, an edge layer, etc. The Clos network 300 is a leaf-spine topology, wherein a spine 302 is positioned between leaf nodes that can be grouped into logical units called bricks. Example bricks are shown at 310, 312, and 314. Each brick 310, 312, 314 includes tier 1 and tier 2 switches. The Clos network 300 is coupled between two separate sites 320, 322, which can be another core layer, an aggregation layer or an edge layer. In this particular example, a spine switch, shown at 330, has two ports, one of which is failing (as indicated using dashed lines) and is connected to a tier 2 switch 340 in brick 310, and another of which is fully operational and is connected to a tier 2 switch 342 in a separate brick 312. The switches 340, 342 are related as indicated by box 350, as they are logically in a same column of a network layer. Additionally or alternatively, the switches 340, 342 can share a same address prefix, such that to a switch 360 in brick 314, both ports in switch 330 have equal weights. When the port of switch 330 fails, additional packets are routed through the port connected to switch 342 resulting in an overloaded link between switch 330 and switch 342.

Due to the relationship between switches 340, 342 and 330, a shared failure domain table 370 associates ports on these switches together. A controller 372 detects the failing port on switch 330 and checks the SFD table 370 to determine related ports. As indicated above, ports on switches 340, 342 are associated with the malfunctioning port on switch 330. Accordingly, the controller 372 can disable all ports on the three switches. In particular, the controller 372 can communicate with the switch's control plane and request that the ports be disabled. Other ports on the switches can continue to operate and pass packets through a data plane of the switches. Instead of disabling the switches, other remedial actions can be taken. However, the actions can be the same for all related ports within the SFD. In other embodiments, the controller 372 can detect if the entire network device is failing rather than just individual ports. In still other embodiments, the controller can detect if the network device is shifted away. In any of these cases, the controller 372 can search in the SFD to determine actions to take in response.

Figure 4:
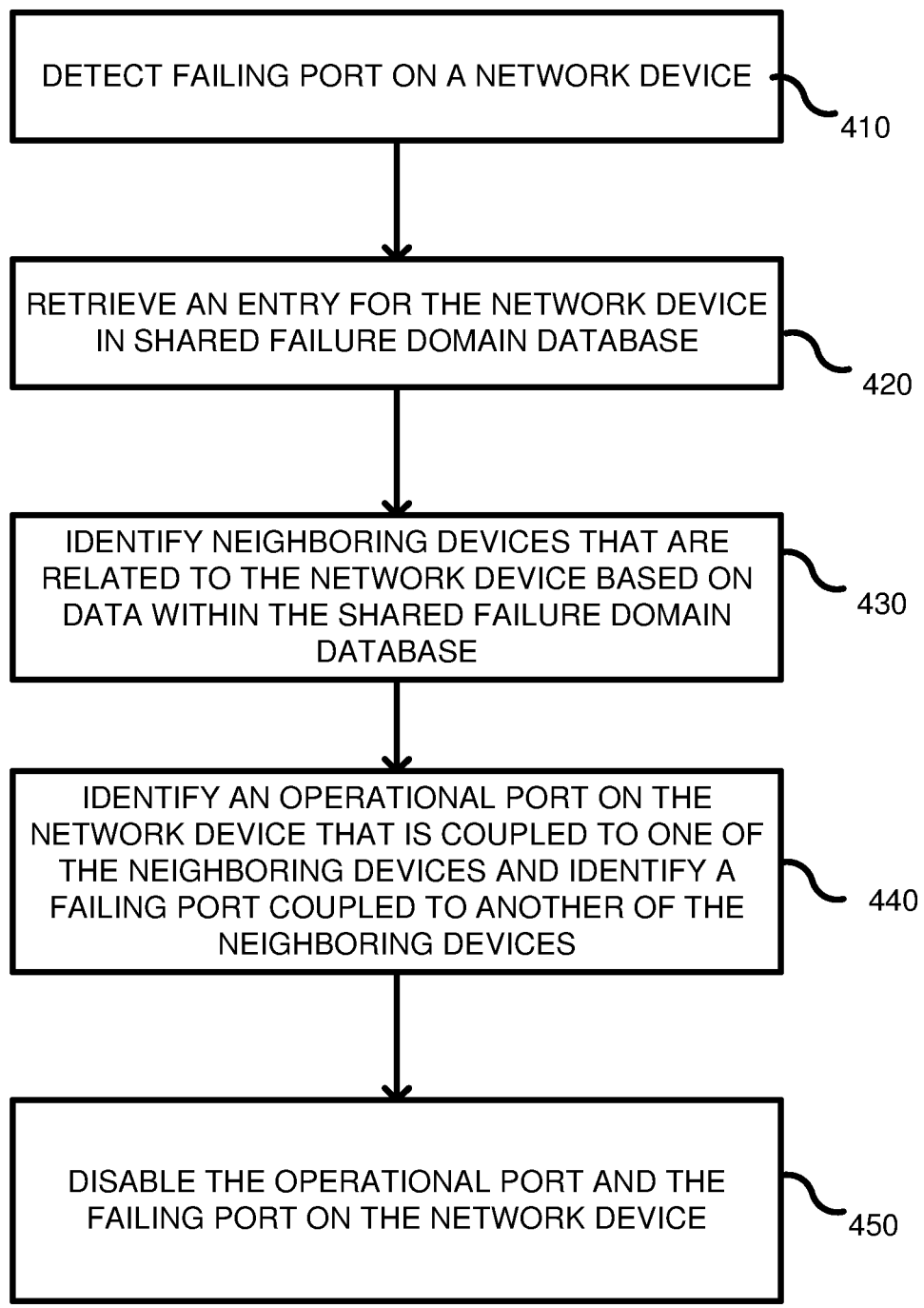
FIG. 4 is a flowchart of a method for configuring network devices using a shared failure domain database.
Figure 5:
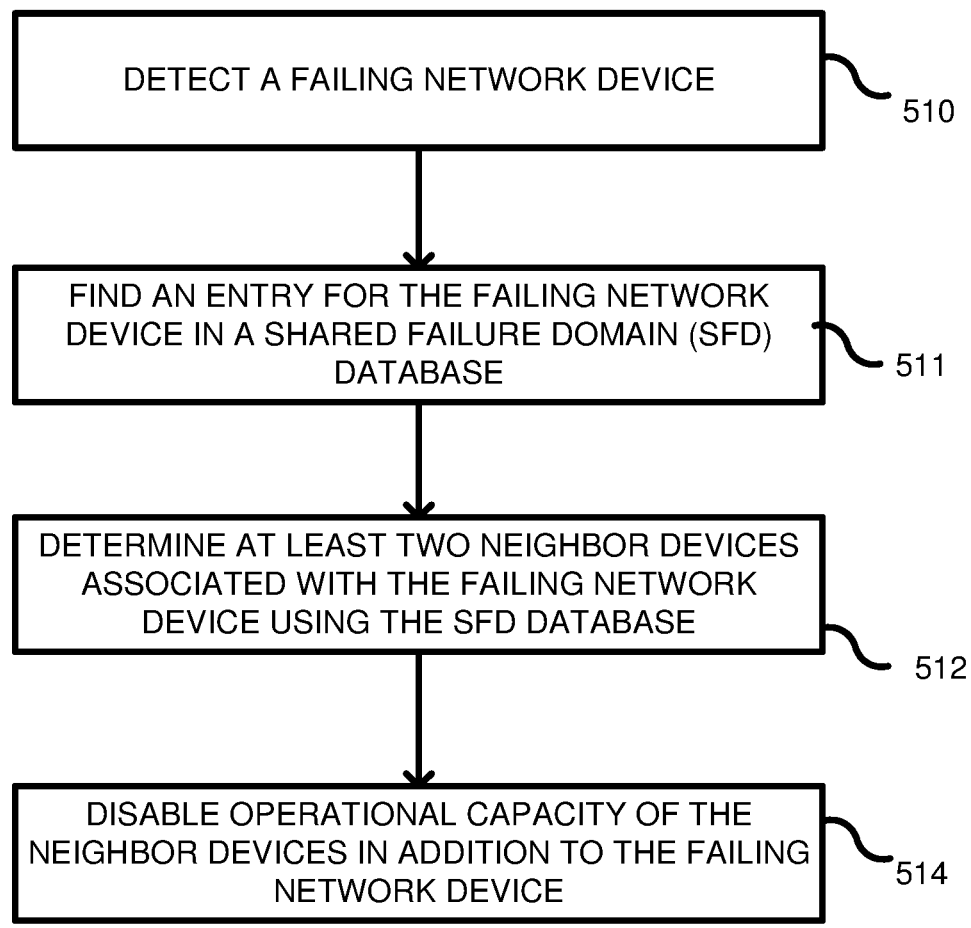
FIG. 5 is a flowchart according to another method for configuring network devices using a shared failure domain database.

FIG. 4 is a flowchart according to a method for performing remedial action on a network device when a failure is detected. In process block 410, a failing port is detected on the network device. For example, the health monitoring service 120 of FIG. 1 can be in communication with a control plane on network device 160. The control plane of the network device 160 can detect dropped packets on a port and indicate to the health monitoring service 160 that the port is failing if a percentage of the dropped packets exceeds a threshold. In process block 420, an entry can be retrieved for the network device in a SFD database. Retrieving the entry can include searching within the SFD database for the entry. Returning to FIG. 1, the health monitoring service 120 can signal the controller 130 of an error on the port within the network device 160. The controller 130 can then take remedial action. In process block 430, neighboring devices that are related to the network device are identified based upon the SFD database. In order to perform the identification, the controller 130 can search the SFD database 140. For example, the network device 160 is associated with an object 150 in the SFD database and that object includes neighboring devices that are related based on network topology. Neighboring devices that are related can be defined, for example, as neighboring devices that share a prefix of an IP address. In process block 440, an operational port is identified that is coupled to one of the neighboring devices, and the failing port is identified that is coupled to another of the neighboring devices. Both the operational port and the failing port are identified through the object field 152 within the device object 150. In sum, the ports within this object are related ports. Related ports on the device 160 are ports that can have increased network traffic due to a failing port. Similarly, the neighboring devices in this same object field can be those devices coupled to the related ports. In process block 450, the operational port and the failing port are disabled on the network device. Disabling the ports includes the controller 130 communicating with the control plane of the device 160 and instructing the device to shut down the identified ports. The control plane can then communicate with the ports in the data plane and disable the ports so that no further network traffic passes through the ports. Other ports that are unrelated can continue to be operational by forwarding packets to neighboring devices in accordance with a forwarding table within the device 160. In some embodiments, ports on the related neighbor devices (see ports W and Z in FIG. 1) can likewise be disabled. Thus, using the SFD database, the controller 130 can detect a failing port and disable not only the failing port, but other ports that are operational (not dropping packets or other malfunctions) so as to increase the overall network capacity. In other embodiments, the controller 130 can detect a failing device or a device that is shifted away, and use the SFD database FIG. 5 is a flowchart of a method according to another embodiment for performing remedial action in response to a failing network device. In process block 510, a failing network device can be detected. The failing network device can be a result of one or more ports failing on the network device. Other reasons can also be responsible for the network device being classified as failing, such as a defect in the operation of the control plane of the network device or a power loss to the network device (hard or soft failures). Thus, the entire network device can be failing or only a portion thereof. The detection of the failing network device can be accomplished by a health monitoring service 120 executing on a server computer remote from the failing device 160. Communications between the health monitoring service and the device 160 can be pull- or push-type communications in order to determine that the network device is failing. In some cases, the health monitoring service can time out in response to a status request to the device 160 due to the device being unresponsive, such as when there are control plane malfunctions. Thus, there are numerous error detection mechanisms that can be deployed based on the particular design. In process block 511, a SFD database can be searched for an entry associated with the failing network device. For example, the controller 130 can used the network device as a key in performing a search in the SFD 140. In process block 512, a determination is made of at least two neighbor devices associated with the failing device. Returning to FIG. 1, the neighbor devices N and M are related neighbor devices to the failing device 160. The identification of these devices can be obtained through the SFD database as shown at 152. In process block 514, operational capacity of the determined neighbor devices can be disabled in addition to operational capacity of the failing network device. For example, the entire devices 1, N and M can be disabled, the entire devices 1, N and M can be shifted away or particular ports can be disabled. In the case of ports being disabled, ports W and Z in devices N and M, respectively, are disabled as one of the ports Z is coupled to the failing port Y and the other port W is coupled to a port X that would receive increased network traffic due to failure of port Y. In addition, ports X and Y on the failing device can be disabled. Thus, operational ports on neighbor devices and at least one operational port on the failing device can be disabled despite that these ports are not malfunctioning. The result is network traffic is shifted to fully functioning devices and increased throughput is maintained.

Figure 6:
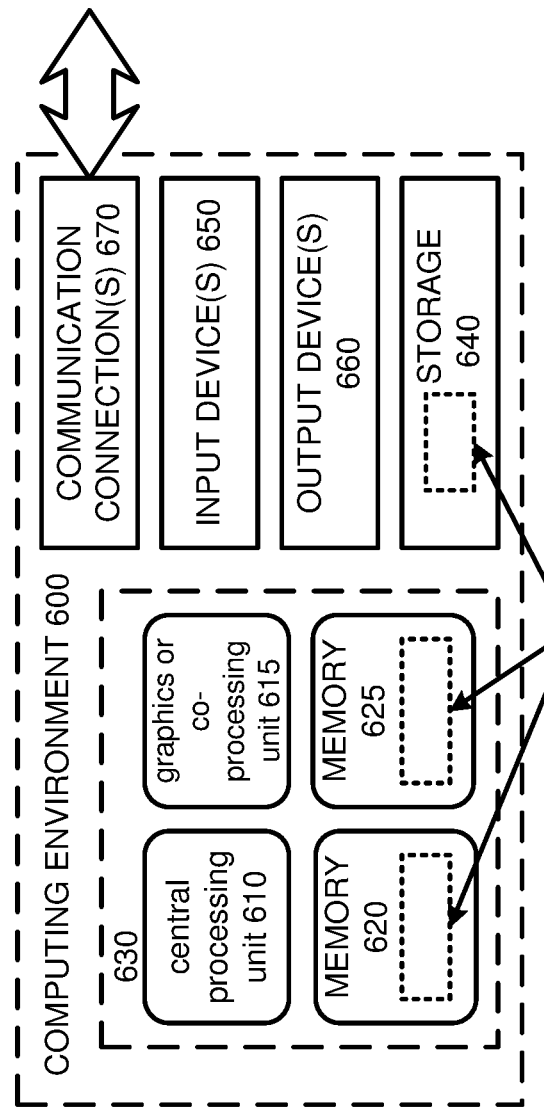
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). Features of the computing environment can be included in the control plane of a network device.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of performing remedial action on a network device, the method comprising:
    detecting a failing port on a network device;
    retrieving an entry for the network device from a database including shared failure domains, which associates the failing port to other ports on the network device or ports on neighboring devices, wherein the network device and the neighboring devices are in a multi-tiered network and wherein the entry from the database is generated by identifying neighbor network devices having a same address prefix as the network device found in a forwarding table of the network device;
    using the entry in the database for the network device, identifying neighboring devices to the network device that are related to the network device based on the database;
    identifying an operational port on the network device that is coupled to one of the neighboring devices and identifying the failing port as coupled to another of the neighboring devices; and
    disabling ports including the failing port on the network device that are identified in the entry in the database as having the same address prefix as the network device.

2. The method of claim 1, further including identifying operational ports on the neighboring devices that are coupled to the network device having the failing port; and
    disabling the operational ports on the neighboring devices.

3. The method of claim 1, wherein the network device is a switch in a three-tier Clos network.

4. The method of claim 1, wherein the network device is within a core layer of a first data center and the neighboring devices are within a core layer of a second data center.

5. The method of claim 1, wherein the operational port is a first operational port and wherein the network device includes a second operational port that remain active after the failing port is disabled.

6. A method, comprising:
    detecting a failing network device in a network;
    finding an entry within a shared failure domain (SFD) database associated with the failing network device, wherein the entry identifies neighbor network devices associated with the failing network device by having a same address prefix;
    determining at least two neighbor devices having the same address prefix using the entry in the SFD database; and
    disabling operational capacity of the neighbor devices having the same address prefix as identified in the SFD and the failing network device.

7. The method of claim 6, wherein the disabling of the operational capacity includes disabling one or more ports on the neighbor devices that are not failing, disabling the neighbor devices, or shifting away the neighbor devices.

8. The method of claim 6, wherein the failing network device includes an entirety of the network device shutting down or includes a failing port, which is disabled as a result of the disabling of the operational capacity, and wherein the failing network device includes operational ports that remain active after the failing port is disabled.

9. The method of claim 6, wherein the determining includes searching for the failing network device in the SFD database that associates ports on the at least two neighbor devices with ports on the failing network device.

10. The method of claim 9, wherein a first of the ports on the failing network device is failing and a second of the ports on the failing device is operational, and the method further includes disabling the first and second ports, while other operational ports on the failing network device remain operational.

11. The method of claim 6, wherein the at least two neighbor devices are associated with the failing network device based upon network topology and network management rules.

12. The method of claim 6, wherein the failing network device is a switch in a three-tier Clos network.

13. The method of claim 6, wherein the failing network device is within a core layer of the network located in a data center and the at least two neighbor devices are within an aggregation layer of the data center.

14. The method of claim 6, further including identifying a failing port on the failing network device coupled to one of the at least two neighbor devices and identifying an operational port on the failing network device coupled to the other of the at least two neighbor devices, and wherein both the failing port and the operational port are disabled.

15. The method of claim 6, wherein the network device is a router or a switch.

16. The method of claim 6, wherein the failing network device is within a spine layer of a three-tier network topology and the neighbor devices are within a second tier of the three-tier network topology.

17. A system, comprising:
  a network switch having a plurality of operational ports and a failing port;
  a plurality of neighbor switches, wherein a first of the plurality of neighbor switches is coupled to one of the plurality of operational ports, and a second of the plurality of neighbor switches is coupled to the failing port, wherein the first and the second of the plurality of neighbor switches are on a same tier; and
  a controller coupled to the network switch and the plurality of neighbor switches, the controller configured to:
    read a database associating ports in the network switch with ports in the plurality of neighbor switches, wherein the database is populated by using a forwarding table of the network switch and identifying the first and second neighbor switches in the forwarding table that have a same address prefix as the network switch; and
    perform a given action on the first and the second of the plurality of neighbor switches having the same address prefix within the database as the network switch in response to detecting the failing port is not operational.

18. The system of claim 17, wherein the given action is to disable the failing port and the associated ports.

19. The system of claim 17, wherein the database comprises objects that associate the failing port on the failing device with an operational port on the failing device.

20. The system of claim 17, wherein the network switch and the plurality of neighbor switches are within a Clos network within one or more data centers.

* * * * *